United States Patent [19]
Kurauchi et al.

[11] Patent Number: 5,258,156
[45] Date of Patent: Nov. 2, 1993

[54] PROCESS FOR PRODUCING MICROPOROUS FILM HAVING BREAKAGE RESISTANCE WHEN MELTED

[75] Inventors: Hiroshi Kurauchi; Tetsuo Akazawa, both of Hirakata, Japan

[73] Assignee: Ube Industries, Ltd., Ube, Japan

[21] Appl. No.: 741,927

[22] Filed: Aug. 8, 1991

[30] Foreign Application Priority Data

Aug. 9, 1990 [JP] Japan .................. 2-211396
Nov. 29, 1990 [JP] Japan .................. 2-332024

[51] Int. Cl.$^5$ .................. B29C 55/06; B29C 67/20; B29C 71/00
[52] U.S. Cl. .................. 264/154; 264/210.7; 264/235.6; 264/288.4; 264/288.8; 264/DIG. 73
[58] Field of Search ............ 264/154, DIG. 13, 288.8, 264/210.7, 288.4, 291, 235.6, 209.5, DIG. 62, DIG. 73

[56] References Cited

U.S. PATENT DOCUMENTS

| Re. 28,606 | 11/1975 | Ikeda et al. | 264/288.8 |
|---|---|---|---|
| 3,407,253 | 10/1968 | Yoshimura et al. | 264/154 |
| 3,426,754 | 2/1969 | Bierenbaum et al. | 264/288.8 |
| 3,544,671 | 12/1970 | Sandiford | 264/288.8 |
| 3,558,764 | 1/1971 | Isaacson et al. | 264/DIG. 13 |
| 3,619,460 | 11/1971 | Chill | 264/288.4 |
| 3,679,538 | 7/1972 | Druin et al. | 264/DIG. 13 |
| 3,734,994 | 5/1973 | Blecha | 264/DIG. 73 |
| 3,801,692 | 4/1974 | Zimmerman | 264/154 |
| 3,843,761 | 10/1974 | Bierenbaum et al. | 264/210.1 |
| 4,620,956 | 11/1986 | Hamer | 264/235.6 |
| 4,814,124 | 3/1989 | Aoyama et al. | 264/210.7 |
| 4,879,078 | 11/1989 | Antoon, Jr. | 264/154 |
| 4,980,101 | 12/1990 | Beck et al. | 264/288.8 |
| 5,073,316 | 12/1991 | Bizen et al. | 264/210.7 |

FOREIGN PATENT DOCUMENTS

| 210059 | 1/1987 | European Pat. Off. |
| 342026 | 11/1989 | European Pat. Off. |
| 378346 | 7/1990 | European Pat. Off. |
| 57-47017 | 10/1982 | Japan |
| 60-37201 | 8/1985 | Japan |
| 61-46564 | 10/1986 | Japan |

Primary Examiner—Jay H. Woo
Assistant Examiner—Duane S. Smith
Attorney, Agent, or Firm—Armstrong, Westerman, Hattori, McLeland & Naughton

[57] ABSTRACT

A process for producing a microporous stretched polyolefin film having a large number of micropores, whereby an unstretched polyolefin film is stretched to predetermined strain amount at a constant stretching temperature by using different strain rates in the initial stage to the final stage. A microporous polyolefin film obtained by the above process can retain a film state even at the melting point or higher temperatures when the film is fixed at the periphery.

6 Claims, 3 Drawing Sheets

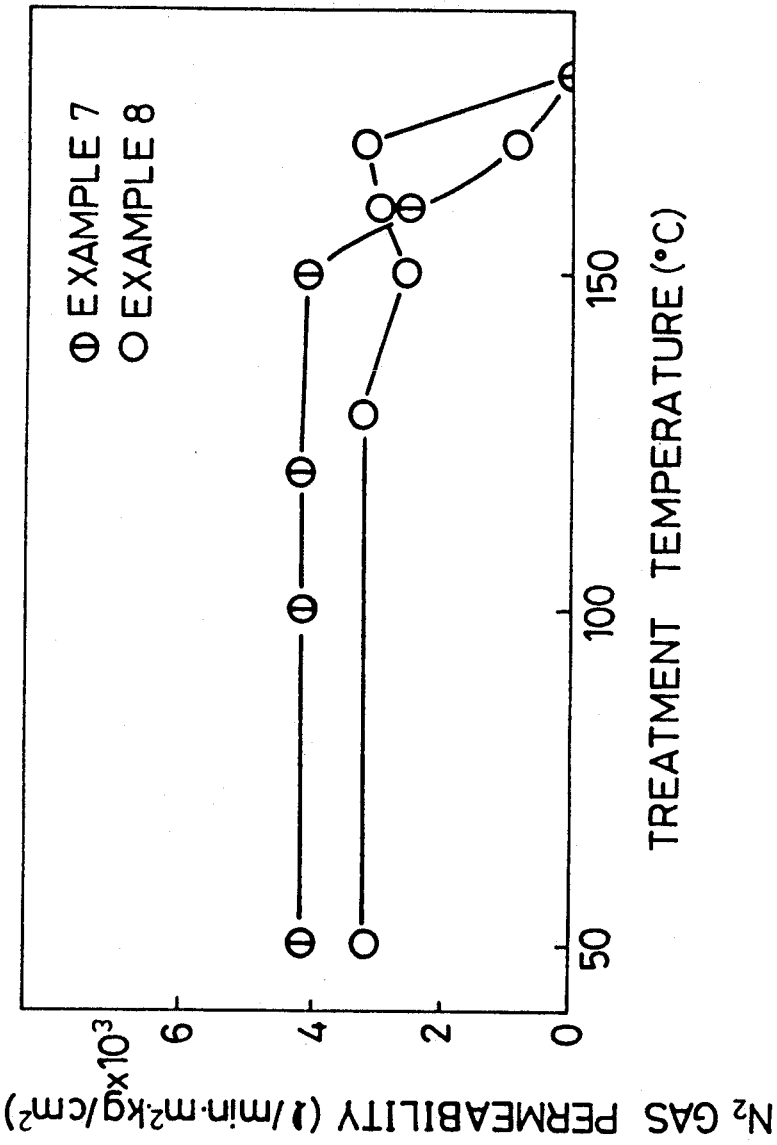

PROCESS FOR PRODUCING MICROPOROUS FILM HAVING BREAKAGE RESISTANCE WHEN MELTED

FIELD OF THE INVENTION AND RELATED ART STATEMENT

The present invention relates to a process for producing a microporous film, as well as to a microporous film having breakage resistance when melted, produced by said process. More particularly, the present invention relates to a process for producing a microporous film, which process comprises stretching an unstretched polyolefin film at a constant stretching temperature by using different strain rates, as well as to a microporous film having breakage resistance when melted, which is obtained by said process and which can retain a film state even at the melting point or higher temperatures when the film is fixed at the periphery.

For production of a microporous film, i.e., a film of a polymeric material (e.g., polyolefin) having a large number of microperforations, there is known, for example, a process comprising dispersing an easily soluble substance in a polymeric material, molding the dispersion into a film shape, and dissolving the easily soluble substance present in the film, in a solvent to remove the substance and form a large number of micropores in the film.

Recently, there has been generally employed a process for producing a microporous film from a thermoplastic crystalline polymeric material, which process comprises subjecting a thermoplastic crystalline polymeric material to T-die or inflation film molding to prepare a film (an oriented crystallized unstretched film), heat-treating the unstretched film using rolls or an oven, stretching the resulting unstretched film at a low strain rate by the use of, for example, rolls of different peripheral velocities to generate crazing in the film, and heat-setting the resulting film to produce a microporous film.

Processes for producing a microporous film by stretching a crystalline polyolefin film to form pores in the film, are disclosed in, for example, Japanese Patent Application Kokai (Laid-Open) Nos. 117951/1982, 68414/1979, 138623/1979, 32976/1977, 107507/1980, 121737/1987 and 22069/1975 and Japanese Patent Publication Nos. 24214/1980, 2176/1975 and 32531/1980. In these processes, the step for stretching or obtaining porous films is divided into the initial stage and the latter half stage, and the stretching is effected using different stretching temperatures in these stages.

These microporous films consisting of a polymeric film having a large number of micropores are in wide use in various fields. Their application fields are, for example, a filter film or a separation film used for air purification, water treatment, etc.; a separator used in cells or batteries, electrolysis, etc.; a gas exchange film or a separation film used in artificial lungs, plasma separation, etc.; and a filter film or a separation film used for bacteria removal in production of sake, draft beer, fresh juice, etc. or for enzyme purification. As the application fields of the microporous films are widened, their use conditions are diversified. Accordingly, microporous films which can be used under high temperature conditions have become necessary.

In the above-mentioned conventional processes for producing a microporous film, however, the pore sizes, i.e., the diameters of pore, are dependent upon the final stretch ratio; therefore, the ranges of conditions enabling formation of pores at a desired porosity are narrow and it was impossible to control the pore sizes. Further, it was difficult to produce a microporous film of high porosity at a high strain rate.

Moreover, in the microporous films produced according to the conventional processes, the micropores were plugged when the films reached the melting point of the thermoplastic polymeric material constituting the films or higher temperatures, which caused the melting and breakage of the films (the plugging of micropores and the melting and breakage of film took place substantially at the same time). When such a conventional microporous film is used as a separator for cell or battery, the film may be heated under some use conditions; the heating may invite the melting and breakage of the film and cause short-circuiting. Thus, the conventional microporous films had such a fear and a safety problem when used as a separator for cell or battery.

SUMMARY OF THE INVENTION

The present invention is intended to eliminate the drawbacks of the conventional processes and the microporous films produced thereby.

According to the present invention, there is produced a process for producing a microporous polyolefin film having a large number of microperforations, by stretching, which process comprises stretching an unstretched polyolefin film to a predetermined strain amount at a constant stretching temperature by using different strain rates in the initial stage to the final stage.

The present invention further provides a microporous polyolefin film having breakage resistance when melted, which is obtained by the above process and which can retain a film state even at the melting point or higher temperatures when the film is fixed at the periphery.

The process of the present invention enables production of a microporous film having desirably controlled pore sizes by stretching an unstretched polyolefin film keeping its thickness and width constant at a constant stretching temperature using different strain rates. The process of the present invention can provide improved productivity, because it stretches an unstretched polyolefin film at a large strain rate by taking up it at a slow rate to generate crazing in the initial stage and at a small strain rate by taking up it at a high rate to increase productivity in the second stage and later.

The microporous film produced according to the process of the present invention can retain a film state even when the film is heated to the melting point of the polymeric material constituting the film or to higher temperatures and the pores are plugged; therefore, when used, for example, as a separator for alkali cell or the like, can prevent short-circuiting, etc. in emergency; accordingly, has high reliability and a very high industrial value.

BRIEF DESCRIPTION OF THE DRAWINGS

FIG. 3 is a graph showing the relations between nitrogen gas permeability and temperature, obtained with the microporous films of Examples of the present invention.

DETAILED DESCRIPTION OF THE INVENTION

Figure 1:
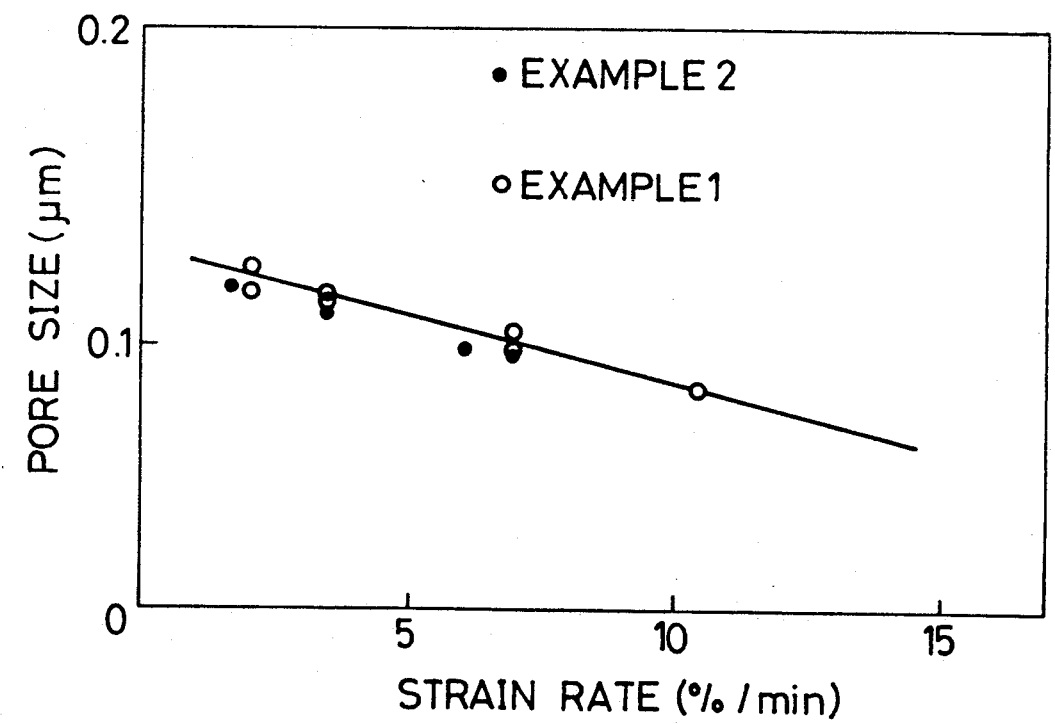
FIG. 1 is a graph showing the relations between strain rate and pore size, obtained in Examples 1 and 2.

In the present invention, a material film is stretched at different strain rates. Usually, it is stretched in two stages or more to a predetermined stretch ratio (the strain amount), i.e., at the initial stage to a stretch ratio of 5-100%, at the second stage or later stage to a stretch ratio of 160-400% by using different strain rates in these stages. In the present invention, strain rate is expressed by strain amount (%) per minute and is determined by (a) a gap between two take-up rolls for unstretched film and (b) the peripheral velocities of the rolls. The strain rate can be changed by changing the stretching rate expressed by the ratio of the peripheral velocities of the two rolls under the constant stretch ratio between the two rolls with the specified gap, or by changing the stretch ratio (the strain amount) between the two rolls with the specified gap. The microporous film of the present invention obtained by stretching, even when it is heated to the melting point of the material film or higher temperatures and causes the plugging of the micropores, invites no immediate melting and breakage and can retain a film state.

The present invention is hereinafter described in detail.

In the present invention, in the first stage stretching is carried out first at a strain rate of 500%/min or less to give rise to initial strain and resultant initial crazing, and later at a strain rate of 100%/min or less to a strain amount of 100% or less; thereby, a microporous film having pore sizes of 0.05-0.25 μm measured by the bubble point method can be produced.

The preferable strain rate in the initial stage is preferably 100%/min or less.

In the second stage or later, stretching is preferably carried out at a strain rate of 50%/min or less to a final strain amount of 160-400%. Stretching at a strain rate falling in this range can produce a microporous film having a porosity of less than 60%. Meanwhile, when a microporous film having a porosity of 60% or more is required, the strain rates in the second and later stages are differentiated further and the strain rate in the final stage is made smaller than that in the intermediate stage, whereby plugging of micropores can be prevented and a microporous film of higher porosity can be produced. The strain rate in the final stage is desirably 10%/min or less to obtain a microporous film of higher porosity. In the case of a microporous film having breakage resistance when melted, which is used in a state the periphery is fixed, the porosity is controlled at 20-75%, preferably 45-65%.

In the present invention, a thermoplastic crystalline polymeric material is made into an oriented crystallized unstretched film; this unstretched film is stretched to a predetermined stretching ratio by using different strain rates in the initial stage to the final stage (preferably in the first stage and the second stage, or in the first stage, the intermediate stage and the final stage); thereby, a microporous film having desired pore sizes can be produced at improved productivity.

As the polyolefin used for production of the microporous film of the present invention, there can be mentioned, for example, a high-density polyethylene, a polypropylene and a poly(4-methylpentene-1). A polypropylene is particularly preferable. The polypropylene has no particular restriction and includes a polypropylene homopolymer and a random, block or graft copolymer between propylene and other monomer or oligomer.

The melt viscosity, i.e. melt flow index (MFI) or melt index (MI) of the polyolefin used has no particular restriction as long as it can be molded into a film. In the case of a polypropylene, it is preferable to use a polypropylene having a MFI of 1-10 (e.g., UBE Polypropylene F103EA, UBE Polypropylene F109K manufactured by UBE Industries, Ltd.) and a weight-average molecular weight of 250,000-400,000, in view of the moldability or productivity of the desired film.

There can also be used a polyolefin containing additives such as plasticizer, coloring agent, flame retardant, filler and the like.

In the present invention, a polyolefin is first molded into an unstretched polyolefin film according to a known method for film production. Then, the unstretched film is heat-treated if necessary and stretched using rolls of different peripheral velocities.

As the known methods for film production which can be used in the present invention, there can be mentioned, for example, an inflation film molding method and a T-die film molding method. The molding conditions employed in such a method can be appropriately selected according to the known technique. When, for example, a polypropylene is used, a molding temperature of 200°-210° C., a take-up rate of 30-40 m/min, a blow ratio 0.5-1.1 and a draft ratio of 60-150 are preferred in the inflation molding method; a molding temperature of 200°-210° C., a take-up rate of 40-50 m/min, a clearance of 25-100 mm, a roll temperature of 80°-100° C. and a draft ratio of 60-150 are preferred in the T-die molding method. The unstretched polypropylene film obtained under the above molding conditions has an elastic recovery of 30-80%, preferably 60-80% and a melting point of about 164° C.

The thus obtained unstretched polyolefin film is preferably subjected to a heat treatment (annealing) before being subjected to a stretching step. This heat treatment before stretching can allow the unstretched polyolefin film to have an increased crystallinity, whereby the microporous film obtained by subsequent stretching can have further improved properties. The heat treatment is effected, for example, by heating an unstretched polyolefin film in air at 5°-70° C. lower than the melting point of the polyolefin in a circulating hot air oven, or for 3 seconds or longer with hot rolls. In the case of a polypropylene film, the heat treatment is preferably effected at 140°-165° C. for 1-19 minutes. The thus obtained heat-treated film has an elastic recovery of 85-93%, preferably 88-93% and a melting point of about 165° C.

The unstretched polyolefin film after heat treatment is stretched using rolls of different peripheral velocities (the use of such rolls gives rise to a strain rate). The stretching is carried out in the initial stage, the second stage or later; preferably the initial stage has 1-7 steps and the second stage or later have 7-28 steps. One step refers to take-up between two rolls. It is rare to obtain a desired stretch ratio in one step, and stretching is generally effected in several steps to obtain a desired stretch ratio. When, for example, a polyolefin film is stretched, it is preferable that the same stretching temperature (90°-145° C.) be used in the initial stage, the second stage or later and that the heating is made in a circulating hot air oven or with hot rolls.

The stretch ratio can be varied depending upon the average pore size of desired microporous polyolefin film which is determined by the application purpose of the film. In the case of, for example, a polypropylene film, the stretch ratio is preferably 5-100% in the initial stage and finally 160-400% in the second stage or later.

The microporous polyolefin film obtained by the stretching step is preferably heat-treated. This heat treatment is mainly intended to thermally fix the formed microperformations, and is effected ordinarily by passing the stretched microporous polyolefin film over or between hot rolls.

The heat treatment (thermal setting) is effected, for example, by heating the stretched microporous polyolefin film in air for 3 seconds or longer at a temperature of 5°-60° C. lower than the melting point of the polyolefin used. When the heating temperature is higher than the upper limit, the formed perforations are plugged in some cases; when the temperature is lower than the lower limit or the heating time is shorter than 3 seconds, the thermal setting tends to be insufficient, which tends to cause plugging of perforations later or cause thermal shrinkage of perforations due to temperature change during actual use of microporous film. Incidentally, the relaxation degree of the film in the lengthwise direction in this heat treatment is 0-25%.

The specific heating temperature in the above heat treatment is generally 110°-165° C., preferably 130°-155° C. in the case of a polypropylene film; generally 70°-125° C., preferably 80°-120° C. in the case of a high-density polyethylene film; generally 150°-210° C., preferably 160°-200° C. in the case of a poly(4-methylpentene-1) film.

The microporous film obtained by the above process, similarly to the conventional microporous films, can be used in various fields, for example, as a filter film or a separation film used for air purification or water treatment; as a separator used in cells or batteries, or electrolysis; and as a gas exchange film or a separation film used in artificial lungs or for plasma separation.

Further, the microporous film having breakage resistance when melted, according to the present invention is used in a state that the periphery is fixed. The film causes no breakage and can retain a film state even when it is heated to temperatures higher than the melting point of the starting material; therefore, the film can be very effectively used as separator for alkali cell, etc. In particular, the microporous film having a porosity of 20-75%, preferably 45-65%, has excellent breakage resistance when melted and is useful as a microporous film having breakage resistance when melted.

EXAMPLES

The present invention is hereinafter described in more detail with reference to Examples. However, the present invention is not restricted to these Examples.

In the Examples, properties of microporous film were measured in accordance with the following test methods.

Water Permeability

A sample film was treated with alcohol to make it hydrophilic. The resulting film was fitted to a film holder having an effective permeation area of $1.26 \times 10^{-3} m^2$, and water was supplied thereto at a pressure of 1 kg/cm$^2$ to measure the amount of water permeating the film in one minute. The water permeability of the sample was calculated using the following formula.

Water permeability (l/min·m$^2$·kg/cm$^2$) = amount of water permeating per minute/effective film area

Pore Size

Pore size is defined as the maximum peak pore size based on the pore size distribution obtained by one of the following methods.
Method A: Bubble point method
Method B: Mercury pressure porosimetry
Method C: Measurement of the pore size distribution using a photograph obtained by scanning electronic microscope

Porosity

Porosity was measured using a mercury pressure porosimeter (a product of QUANTA CHROME).

Gas Permeability

A sample film was fitted to a film holder having an effective permeation area of $1.26 \times 10^{-3} m^2$, and nitrogen gas was supplied thereto at a pressure of 1 kg/cm$^2$ to measure the amount of the gas permeating the film in one minute. The gas permeability of the sample film was calculated using the following formula.

Gas permeability (l/min·m$^2$·kg/cm$^2$) = amount of gas permeating per minute/effective film area

Viscoelasticity

Storage modulus of tensile modulus was measured at a frequency of 0.1 Hz using a viscoelasticity analyzer (RSA-II manufactured by Rheometrics Co.).

EXAMPLE 1

This is an example showing the effect of initial stage strain rate on properties of microporous film produced. According to a T-die film molding method using an extruder (diameter: 65 mm$\phi$, length/diameter=26) provided with a T-die of 850 mm in width, a polypropylene as a starting material (UBE-PP-F109K having a MFI of 9 g/10 min, manufactured by UBE Industries, Ltd.) was taken up at a molding temperature of 200° C. at a cooling roll temperature of 90° C. at a draft ratio of 147 to form an unstretched film. The unstretched film was heat-treated at 150° C. for 3 minutes using hot rolls. The heat-treated unstretched film was subjected to initial stage to obtain the stretched film with various strain amount by stretching at various strain rates in the range of 2.0-10.4%/min and then to later-stage stretching at a strain rate of 1.7%/min until a final stretch ratio of 50% was attained. Pore size of each of the obtained stretched microporous films was measured by the method A. The results are shown in Table 1 and FIG. 1.

As is clear from Table 1 and FIG. 1, the pore size of microporous film can be controlled by effecting initial stage stretching at a strain rate in the range of 1.5-10.5%/min.

TABLE 1

| Initial stage strain rate (%/min) | Pore size (μm) (Method A) |
| --- | --- |
| 2.0 | 0.125 |
| 3.4 | 0.118 |
| 6.9 | 0.110 |

TABLE 1-continued

| Initial stage strain rate (%/min) | Pore size (μm) (Method A) |
| --- | --- |
| 10.4 | 0.080 |

EXAMPLE 2

The same heat-treated unstretched film as in Example 1 was subjected to initial stage stretching at various strain rates in the range of 1.6–6.9%/min until the stretch ratio of 50%. (In Example 1, initial stage stretching was effected at various strain rates by changing the strain amount.)

The results are shown in Table 2 and FIG. 1. The pore size was measured by the method A.

TABLE 2

| Initial stage strain rate (%/min) | Pore size (μm) (Method A) |
| --- | --- |
| 1.6 | 0.122 |
| 3.4 | 0.112 |
| 6.0 | 0.100 |
| 6.9 | 0.096 |

As is clear from Table 2, the pore size of microporous film can be controlled by effecting initial stage stretching at a strain rate in the range of 1.6–6.9%/min.

EXAMPLE 3

This Example shows the effect of initial stage strain rate when a microporous film of small pore sizes is obtained.

Molding of unstretched film and its heat treatment were carried out in the same manner as in Example 1 except that the starting material was changed to a polypropylene (UBE-PP-F103EA manufactured by UBE Industries, Ltd.). The heat-treated unstretched film was subjected to stretching as follows. That is, the initial stage stretching was effected to obtain the stretched film with various strain amount at various strain rates in the range of 46.2–276.9%/min; the second stage stretching was effected at a strain rate of 26.3%/min; the final stretch ratio was 200% and the stretching temperature was 130° C. The results are shown in Table 3.

As is clear from Table 3, the size of the initial crazing varies with the strain rate of 46.2–276.9%/min in the initial stage resulting that final pore size of microporous film can be controlled.

Further, it is also clear that stretching in the second or later stage increases the pore size from the initial size to the final one.

In this case, the pore size could not be measured by the method A; therefore, it was measured by the method B or C.

TABLE 3

| Initial stage strain rate (%/min) | Water permeability (l/min · m² · kg/cm²) | Initial stretched pore size (μm) (Method B) | Final pore size (μm) (Method B) | Final pore size (μm) (Method C) |
| --- | --- | --- | --- | --- |
| 46.2 | 7.5 | 0.256 | 0.352 | 0.4 × 0.1 |
| 107.7 | 7.9 | 0.196 | 0.313 | 0.35 × 0.1 |
| 144.2 | 4.3 | 0.169 | 0.242 | 0.30 × 0.1 |
| 184.6 | 3.9 | 0.139 | 0.233 | 0.25 × 0.1 |
| 228.8 | 2.7 | 0.130 | 0.217 | 0.20 × 0.1 |
| 276.9 | 2.1 | 0.123 | 0.201 | 0.20 × 0.1 |

EXAMPLE 4

This Example shows the effect of the strain rate employed in the second stage.

Molding of unstretched film and its heat treatment were carried out in the same manner as in Example 1 except that there was used the same treating material as in Example 3, i.e., the polypropylene (UBE-PP-F103EA). The heat-treated unstretched film was stretched to a final stretch ratio of 250% using a strain rate of 77%/min in the initial stage and a strain rate of 5.5–50%/min in the second stage. The results are shown in Table 4.

TABLE 4

| Second stage strain rate (%/min) | Water permeability (l/min · m² · kg/cm²) | Pore size (μm) (Method C) |
| --- | --- | --- |
| 5.5 | 4.8 | 0.50 × 0.1 |
| 17.3 | 2.6 | 0.30 × 0.1 |
| 30.0 | 2.5 | 0.30 × 0.1 |
| 40.0 | 2.2 | 0.30 × 0.1 |
| 50.0 | 2.0 | 0.30 × 0.1 |

As is clear from Table 4, a controlled pore size can be obtained.

EXAMPLE 5

This Example also shows the effect of the strain rate employed in the second stage.

Using the same polypropylene starting material as in Example 1, an unstretched film was produced in the same manner as in Example 1. The unstretched film was stretched to a final stretch ratio of 350% using a strain rate of 1.7%/min in the initial stage and a strain rate of 2.1–10.5%/min in the second stage. The results are shown in Table 5.

As is clear from Table 5, the size of the micropores can be controlled by effecting second stage stretching at various strain rate in the range of 2.1–10.5%/min. The pore size was measured by the method A.

TABLE 5

| Second stage strain rate (%/min) | Water permeability (l/min · m² · kg/cm²) | Pore size (μm) (Method A) |
| --- | --- | --- |
| 2.1 | 33.8 | 0.20 |
| 4.2 | 18.3 | 0.16 |
| 6.3 | 13.2 | 0.13 |
| 8.4 | 3.0 | 0.11 |
| 10.5 | 2.1 | 0.08 |

EXAMPLE 6

This Example shows the effect of the strain rate employed in the final stage.

Using the same polypropylene starting material as in Example 1, an unstretched film was produced in the same manner as in Example 1. The unstretched film was stretched at a strain rate of 1.7%/min in the initial stage, a strain rate of 4.2%/min in the intermediate stage and, in the final stage, the same strain rate as in the intermediate stage or a strain rate smaller than that as shown in Table 6. By employing a smaller strain rate in the final stretching stage, a microporous film having an increased porosity could be obtained to prevent plugging of micropores. The results are shown in Table 6.

TABLE 6

| Final stage strain rate (%/min) | Porosity (%) | Pore size (μm) (Method A) | Water permeability (l/min · m² · kg/cm²) |
|---|---|---|---|
| 4.2 | 70 | 0.20 | 33.8 |
| 2.1 | 73 | 0.23 | 40.3 |

EXAMPLE 7

Using the same polypropylene starting material, molding of unstretched film and its heat treatment were carried out in the same manner as in Example 1. The heat treated unstretched film was stretched as follows. The strain rate and stretch ratio were 75%/min and 20% respectively in the initial stage, and 25%/min and 150% respectively in the second stage; the stretching temperature was 130° C. The stretched film was heat-treated at 145° C. by hot rolls while retaining the stretched state, to obtain a stretched polypropylene film.

Figure 2:
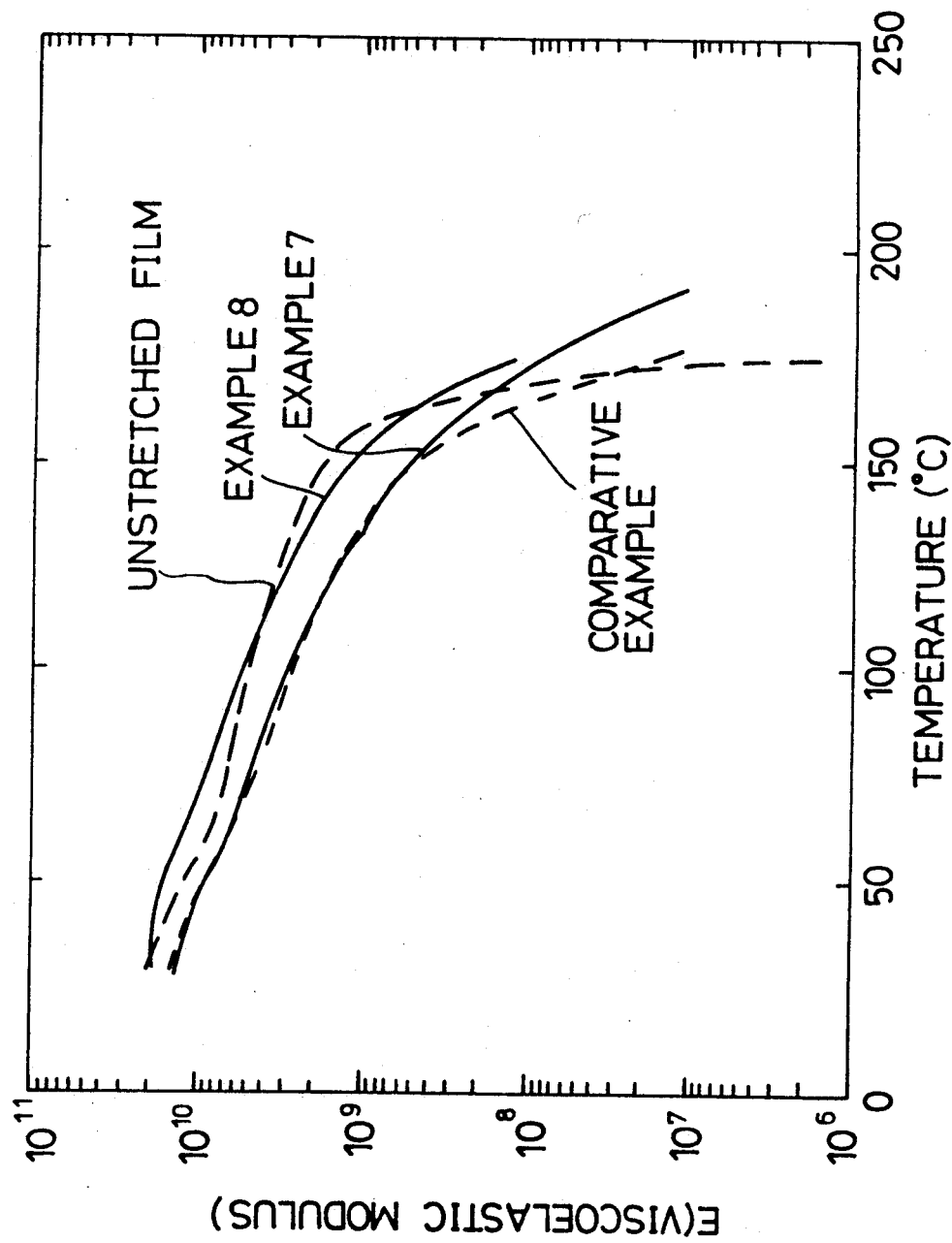
FIG. 2 is a graph showing relations between viscoelastic modulus (E) of microporous film and temperature.

The thus obtained microporous film had a thickness of 25 μm, a porosity of 55% and a gas permeability of 4,200 l/min·m²·kg/cm². The viscoelasticity of the film was measured together with that of the unstretched film. The results are shown in FIG. 2 as a graph between viscoelastic modulus (E) and temperature.

The microporous film was clamped at both ends by a clamp, and was measured for nitrogen gas permeability in the clamped state while being heated in hot air as a heating medium. The results are shown in Table 7. Further, FIG. 3 shows a relation between nitrogen gas permeability and heating medium temperature.

TABLE 7

| | Micropore-retaining temp. (°C.) | Pore plugging-starting temp. (°C.) | Pore plugging-ending temp. (°C.) | Melting & breakage temp. (°C.) |
|---|---|---|---|---|
| Ex. 7 | Room temp. to 150 | 150 | 180 | 195 |
| Ex. 8 | Room temp. to 170 | 170 | 180 | 195 |
| Comp. Ex. 1 | Room temp. to 145 | 145 | 160 | 160 |

As is clear from Table 7, the plugging of microporous film starts at about 150° C. and is substantially complete at 180° C. However, observation indicated that a film state was retained even at about 180° C. and breakage by melting occurred at about 195° C.

This corresponds to a phenomenon seen in FIG. 2 (a graph showing a relation between viscoelastic modulus and temperature), i.e. a phenomenon that the stretched polypropylene film (microporous film) shows gradual viscoelasticity reduction up to about 190° C. while the unstretched film shows sharp viscoelasticity reduction at about 170° C. (the melting point).

EXAMPLE 8

A stretched polypropylene film was obtained in the same manner as in Example 7 except that the same polypropylene material as in Example 1 was used.

The thus obtained microporous film had a thickness of 25 μm, a porosity of 60% and a gas permeability of 3,000 l/min·m²·kg/cm². Further, the viscoelasticity of the film was measured together with that of the unstretched film. The results are shown in FIG. 2 as a relation between viscoelastic modulus (E) and temperature.

The microporous film was measured for nitrogen gas permeability in the same manner as in Example 7. The results are shown in Table 7. Further, the relation between nitrogen gas permeability and heating medium temperature is shown in FIG. 3.

In the microporous film obtained in this Example, the plugging of micropores started at about 170° C. and was substantially complete at 180° C.; however, the microporous film, similarly to that of Example 7, retained a film state even at 180° C. and caused breakage at about 190° C. The gradual viscoelasticity reduction is also seen in FIG. 2 which shows a relation between viscoelastic modulus and heating medium temperature.

COMPARATIVE EXAMPLE 1

A microporous polypropylene film obtained according to a solvent extraction process, was measured for viscoelastic modulus and nitrogen gas permeability in the same manner as in Example 7. The results are shown in FIG. 2 and Table 7.

In the microporous polypropylene film used in this Comparative Example, pore plugging started at about 145° C. and was complete at about 160° C., immediately followed by melting and breakage.

What is claimed is:

1. A process for producing a microporous polyolefin film, comprising:
   i) stretching an unstretched polyolefin film in a first direction at a constant stretching temperature in a first stretching stage at a first strain rate, wherein the strain amount is a maximum of 100% in the first stretching stage, and the first strain rate is initially a maximum of 500%/min and later falls to a maximum of 100%/min, thereby producing a film having an initial strain;
   ii) stretching said film having an initial strain at a constant stretching temperature in a second stage in said first direction at a second strain rate which is different from said first strain rate, wherein said second strain rate is from about 1%/min to 50%/min in the second stage; the total amount of stretching being effective to produce a microporous film,
   wherein said first stretching stage has 1-7 steps and said second stage has 7-28 steps.

2. A process for producing a microporous polyolefin film according to claim 1, wherein the stretching of the unstretched polyolefin film is carried out after the unstretched polyolefin film has been annealed.

3. A process for producing a microporous polyolefin film according to claim 2, wherein the annealing is carried out at a temperature which is 5°-70° C. lower than the melting point of the unstretched polyolefin.

4. A process for producing a microporous polyolefin film according to claim 1, wherein the obtained stretched polyolefin is further stretched at a maximum strain rate of 10%/min.

5. A process for producing a microporous polyolefin film according to claim 1 or 2, wherein the stretched polyolefin is subjected to a heat treatment.

6. A process for producing a microporous polyolefin film according to claim 5, wherein the heat treatment is carried out at a temperature which is 5°-60° C. lower then the melting point of the unstretched polyolefin.

* * * * *